United States Patent
Donley

(10) Patent No.: US 7,882,309 B2
(45) Date of Patent: Feb. 1, 2011

(54) METHOD AND APPARATUS FOR HANDLING EXCESS DATA DURING MEMORY ACCESS

(75) Inventor: Greggory D. Donley, San Jose, CA (US)

(73) Assignee: GlobalFoundries Inc., Grand Cayman (KY)

( * ) Notice: Subject to any disclaimer, the term of this patent is extended or adjusted under 35 U.S.C. 154(b) by 473 days.

(21) Appl. No.: 11/828,382

(22) Filed: Jul. 26, 2007

(65) Prior Publication Data

US 2009/0031088 A1 Jan. 29, 2009

(51) Int. Cl.
*G06F 12/00* (2006.01)

(52) U.S. Cl. ....................................... 711/137
(58) Field of Classification Search ................ None
See application file for complete search history.

(56) References Cited

U.S. PATENT DOCUMENTS

| | | | |
|---|---|---|---|
| 4,980,823 A * | 12/1990 | Liu ........................... | 711/136 |
| 5,375,216 A * | 12/1994 | Moyer et al. ................ | 711/123 |
| 5,566,324 A * | 10/1996 | Kass ........................... | 711/160 |
| 5,826,052 A * | 10/1998 | Stiles et al. ................. | 712/205 |
| 6,266,742 B1 * | 7/2001 | Challenger et al. .......... | 711/133 |
| 6,292,871 B1 * | 9/2001 | Fuente ........................ | 711/136 |
| 6,684,294 B1 * | 1/2004 | Huffman ..................... | 711/112 |
| 2006/0224832 A1 * | 10/2006 | So et al. ..................... | 711/137 |

OTHER PUBLICATIONS

Wang, et al., "Guided Region Prefetching", © 2003 IEEE, p. 1-11.*
Goudarzi, et al., "Object-aware cache", © 2004 IEEE p. 0653-0656.*
Halfhill, "LSI Logic Wants Your SoC", Microprocessor Report, Jun. 12, 2006.

* cited by examiner

*Primary Examiner*—Brian R Peugh
(74) *Attorney, Agent, or Firm*—Meyertons, Hood, Kivlin, Kowert & Goetzel, P.C.; Stephen J. Curran

(57) ABSTRACT

A computer system includes a system memory and a processor having one or more processor cores and a memory controller. The memory controller may control data transfer to the system memory. The processor further includes a cache memory such as an L3 cache, for example, that includes a data storage array for storing blocks of data. In response to a request for data by a given processor core, the system memory may provide a first data block that corresponds to the requested data, and an additional data block that is associated with the first data block and that was not requested by the given processor core. In addition, the memory controller may provide the first data block to the given processor core and store the additional data block in the cache memory.

20 Claims, 3 Drawing Sheets

METHOD AND APPARATUS FOR HANDLING EXCESS DATA DURING MEMORY ACCESS

BACKGROUND OF THE INVENTION

1. Field of the Invention

This invention relates to processor memory read accesses and, more particularly, to handling excess read data.

2. Description of the Related Art

Since s computer system's main memory is typically designed for density rather than speed, microprocessor designers have added caches to their designs to reduce the microprocessor's need to directly access main memory. A cache is a small memory that is more quickly accessible than the main memory. Caches are typically constructed of fast memory cells such as static random access memories (SRAMs) which have faster access times and bandwidth than the memories used for the main system memory (typically dynamic random access memories (DRAMs) or synchronous dynamic random access memories (SDRAMs)).

Modern microprocessors typically include on-chip cache memory. In many cases, microprocessors include an on-chip hierarchical cache structure that may include a level one (L1), a level two (L2) and in some cases a level three (L3) cache memory. Typical cache hierarchies may employ a small fast L1, cache that may be used to store the most frequently used cache lines. The L2 may be a larger and possibly slower cache for storing cache lines that are accessed but don't fit in the L1. The L3 cache may be still larger than the L2 cache and may be used to store cache lines that are accessed but do not fit in the L2 cache. Having a cache hierarchy as described above may improve processor performance by reducing the latencies associated with memory access by the processor core.

As successive generations of DRAM that is used for main system memory have evolved, the data burst transfer sizes have increased. Generally speaking, the burst transfer size refers to the size at which the DRAM can most efficiently transfer data resulting in the highest bandwidth. These newer DRAMs may transfer data in units that are greater than the size (cache line) that many processor cores can handle efficiently.

SUMMARY

Various embodiments of a computer system including a system memory and a processor including one or more processor cores and a memory controller. In one embodiment, the memory controller may be configured to control storage of data to and retrieval of data from the system memory. The processor further includes a cache memory such as an L3 cache, for example, that includes a data storage array for storing blocks of data. In response to a request for data by a given processor core, the system memory may provide a first data block such as, for example, a cache line of data that corresponds to the requested data, and an additional data block that is associated with the first data block and that was not requested by the given processor core. For example, the additional data block may be such a cache line of data before or after the requested cache line. In addition, the memory controller may provide the first data block to the given processor core and store the additional data block in the cache memory.

In one specific implementation, in an effort to keep the additional data in the cache, but sacrificing other data such as victim data that may already be stored there, the memory controller may allocate an entry in the cache memory for the additional data block as a least recently used entry. In another implementation the memory controller may selectively allocate an entry in the cache memory for the additional data block as having a status that is in the range defined by least recently used and most recently used.

Figure 1:
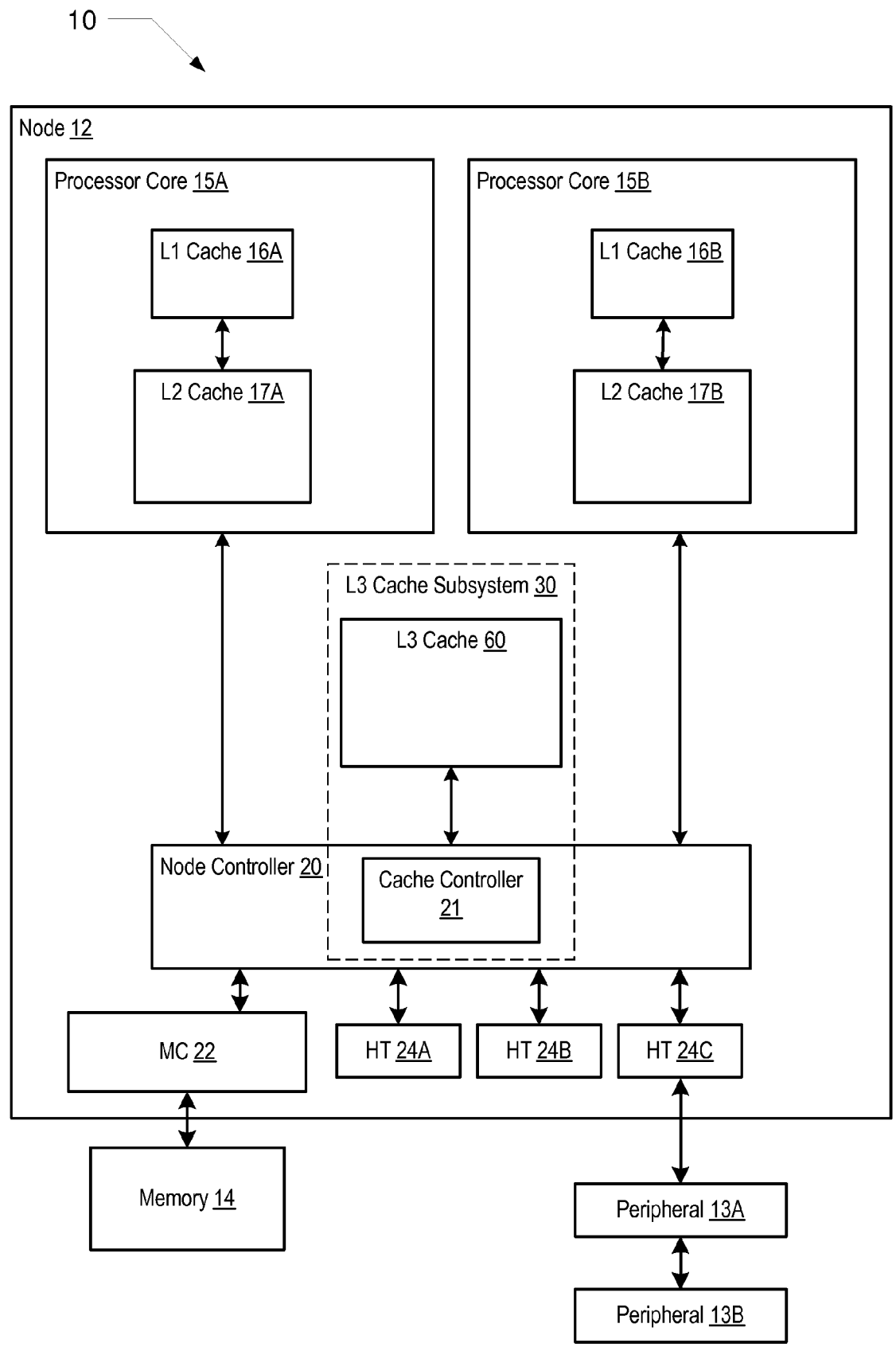
FIG. 1 is a block diagram of one embodiment of a computer system including a multi-core processing node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a computer system 10 is shown. In the illustrated embodiment, the computer system 10 includes a processing node 12 coupled to memory 14 and to peripheral devices 13A-13B. The node 12 includes processor cores 15A-15B coupled to a node controller 20 which is further coupled to a memory controller 22, a plurality of HyperTransport™ (HT) interface circuits 24A-24C, and a shared level three (L3) cache memory 60. The HT circuit 24C is coupled to the peripheral device 16A, which is coupled to the peripheral device 16B in a daisy-chain configuration (using HT interfaces, in this embodiment). The remaining HT circuits 24A-B may be connected to other similar processing nodes (not shown) via other HT interfaces (not shown). The memory controller 22 is coupled to the memory 14. In one embodiment, node 12 may be a single integrated circuit chip comprising the circuitry shown therein in FIG. 1. That is, node 12 may be a chip multiprocessor (CMP). Any level of integration or discrete components may be used. It is noted that processing node 12 may include various other circuits that have been omitted for simplicity.

In various embodiments, node controller 20 may also include a variety of interconnection circuits (not shown) for interconnecting processor cores 15A and 15B to each other, to other nodes, and to memory. Node controller 20 may also include functionality for selecting and controlling various node properties such as the maximum and minimum operating frequencies for the node, and the maximum and minimum power supply voltages for the node, for example. The node controller 20 may generally be configured to route communications between the processor cores 15A-15B, the memory controller 22, and the HT circuits 24A-24C dependent upon the communication type, the address in the communication, etc. In one embodiment, the node controller 20 may include a system request queue (SRQ) (not shown) into which received communications are written by the node controller 20. The node controller 20 may schedule communications from the SRQ for routing to the destination or destinations among the processor cores 15A-15B, the HT circuits 24A-24C, and the memory controller 22.

Generally, the processor cores 15A-15B may use the interface(s) to the node controller 20 to communicate with other components of the computer system 10 (e.g. peripheral devices 16A-16B, other processor cores (not shown), the memory controller 22, etc.). The interface may be designed in any desired fashion. Cache coherent communication may be defined for the interface, in some embodiments. In one embodiment, communication on the interfaces between the node controller 20 and the processor cores 15A-15B may be in the form of packets similar to those used on the HT interfaces. In other embodiments, any desired communication may be used (e.g. transactions on a bus interface, packets of a different form, etc.). In other embodiments, the processor cores 15A-15B may share an interface to the node controller 20 (e.g. a shared bus interface). Generally, the communications from the processor cores 15A-15B may include requests such as read operations (to read a memory location or a register external to the processor core) and write operations (to write a memory location or external register), responses to probes (for cache coherent embodiments), interrupt acknowledgements, and system management messages, etc.

The HT circuits 24A-24C may comprise a variety of buffers and control circuitry for receiving packets from an HT link and for transmitting packets upon an HT link. The HT interface comprises unidirectional links for transmitting packets. Each HT circuit 24A-24C may be coupled to two such links (one for transmitting and one for receiving). A given HT interface may be operated in a cache coherent fashion (e.g. between processing nodes) or in a non-coherent fashion (e.g. to/from peripheral devices 16A-16B). In the illustrated embodiment, the HT circuits 24A-24B are not in use, and the HT circuit 24C is coupled via non-coherent links to the peripheral devices 16A-16B.

The peripheral devices 16A-16B may be any type of peripheral devices. For example, the peripheral devices 16A-16B may include devices for communicating with another computer system to which the devices may be coupled (e.g. network interface cards, circuitry similar to a network interface card that is integrated onto a main circuit board of a computer system, or modems). Furthermore, the peripheral devices 16A-16B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "peripheral device" is intended to encompass input/output (I/O) devices.

Generally, a processor core 15A-15B may include circuitry that is designed to execute instructions defined in a given instruction set architecture. That is, the processor core circuitry may be configured to fetch, decode, execute, and store results of the instructions defined in the instruction set architecture. For example, in one embodiment, processor cores 15A-15B may implement the x86 architecture. The processor cores 15A-15B may comprise any desired configurations, including superpipelined, superscalar, or combinations thereof. Other configurations may include scalar, pipelined, non-pipelined, etc. Various embodiments may employ out of order speculative execution or in order execution. The processor cores may include microcoding for one or more instructions or other functions, in combination with any of the above constructions. Various embodiments may implement a variety of other design features such as caches, translation lookaside buffers (TLBs), etc. Accordingly, in the illustrated embodiment, in addition to the L3 cache 60 that is shared by both processor cores, processor core 15A includes an L1 cache 16A and an L2 cache 17A. Likewise, processor core 15B includes an L1 cache 16B and an L2 cache 17B. The respective L1 and L2 caches may be representative of any L1 and L2 cache found in a microprocessor.

It is noted that, while the present embodiment uses the HT interface for communication between nodes and between a node and peripheral devices, other embodiments may use any desired interface or interfaces for either communication. For example, other packet based interfaces may be used, bus interfaces may be used, various standard peripheral interfaces may be used (e.g., peripheral component interconnect (PCI), PCI express, etc.), etc.

In the illustrated embodiment, the L3 cache subsystem 30 includes a cache controller unit 21 (which is shown as part of node controller 20) and the L3 cache 60. Cache controller 21 may be configured to, in conjunction with the memory controller 22, control the operation of the L3 cache 60.

As described above, the memory 14 may include any suitable memory devices. For example, a memory 14 may comprise one or more random access memories (RAM) in the dynamic RAM (DRAM) family such as RAMBUS DRAMs (RDRAMs), synchronous DRAMs (SDRAMs), double data rate (DDR) SDRAM. Alternatively, memory 14 may be implemented using static RAM, etc. The memory controller 22 may comprise control circuitry for interfacing to the memories 14. Additionally, the memory controller 22 may include request queues for queuing memory requests, etc. As will be described in greater detail below, memory controller 22 may be configured to request data from the memory 14 in response to a request from a processor core (e.g., 15A). In addition, the memory 14 may respond to such a request by providing not only the requested data block(s) but also additional data blocks that were not requested. Accordingly, memory controller 22 may selectively store the additional data blocks within the L3 cache 60.

It is noted that, while the computer system 10 illustrated in FIG. 1 includes one processing node 12, other embodiments may implement any number of processing nodes. Similarly, a processing node such as node 12 may include any number of processor cores, in various embodiments. Various embodiments of the computer system 10 may also include different numbers of HT interfaces per node 12, and differing numbers of peripheral devices 16 coupled to the node, etc.

Figure 2:
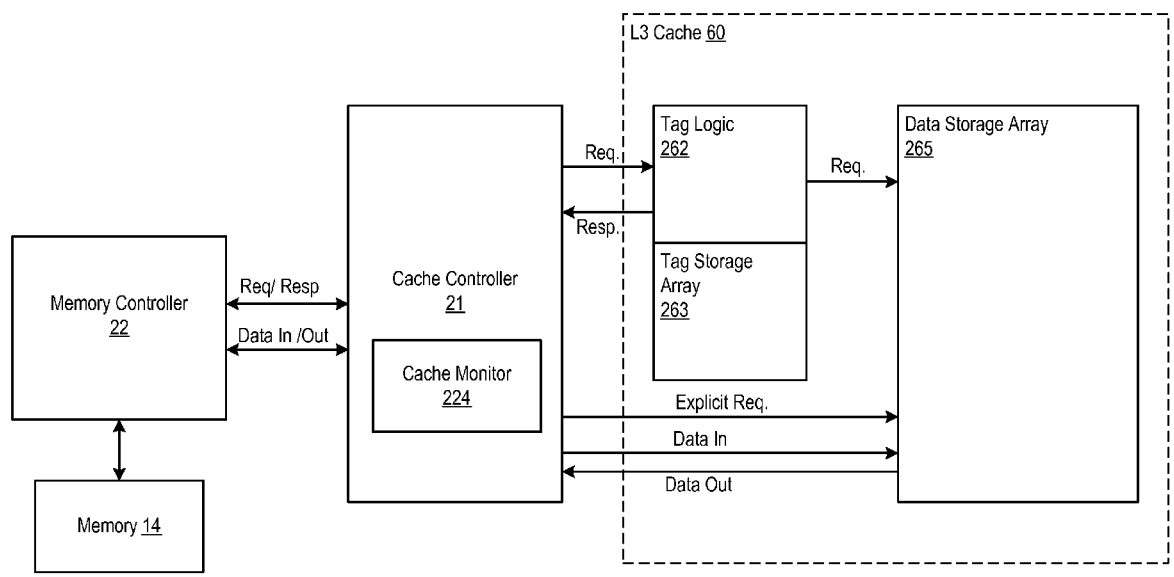
FIG. 2 is a block diagram illustrating more detailed aspects of the computer system of FIG. 1.

FIG. 2 is a block diagram illustrating more detailed aspects of the processor node of FIG. 1. Components that correspond to those shown in FIG. 1 are numbered identically for clarity and simplicity. As described above, memory 14 may respond to a cache line request with not only the cache line data that was requested, but also data that corresponds to one or more additional cache lines. For example, some memory implementations may return the next cache line data that is subsequent to the requested cache line data, and some memory implementations may return the cache line data that just precedes the requested cache line data. In either case, the memory 14 may be configured to return the requested data first or second, so that the memory controller 22 will handle the data accordingly.

In the illustrated embodiment, the L3 cache 60 includes a tag logic unit 262, a tag storage array 263, and a data storage array 265. The data storage array 265 may store the data, while the tag storage array 263 may store address tag information. The tag logic 262 may include circuitry that may be configured to perform functionality associated with tag lookup, returning tag result returns to the cache controller 21, accesses to the data storage array 265, and the like. The cache controller 21 may be configured to control L3 cache operations such as handling and buffering cache read and write requests, and monitoring L3 cache 60 performance.

As mentioned above one of the processor cores 15 may request a cache line of data, for example, in response memory controller 22 may be configured to request the data from memory 14. Memory 14 may return the requested data block and as mentioned above, additional data blocks that correspond to one or more additional cache lines of data that may be subsequent to or preceding the requested cache line. Memory controller 22 returns the requested cache line data to the requesting processor core 15, and stores or causes to be stored within the L3 cache 60, the additional data blocks.

In one embodiment, prior to memory controller 22 requesting the data from memory 14, memory controller 22 may forward the request to cache controller 21, to effectively snoop the L3 cache 60 for the requested data. In such an embodiment, cache controller 21 may send the request for both the requested cache line address and the additional cache line address to tag logic 262. If the requested cache line hits, there is no need to access memory 14, and the data may be returned from the L3 cache 60 instead. However if the requested cache line misses and the additional cache line hits, tag logic may only return the result and not the data. Memory controller 22 may then send the request to memory 14. In this case, once memory 14 returns the requested data, memory controller 14 may stop the transfer of the additional data since it is already stored within the L3 cache 60. By preventing (chopping) the additional data transfer a few memory bus cycles may be saved, which may allow another memory cycle to begin sooner than it otherwise would have. If neither the requested data nor the additional data is stored in the L3 cache 60, memory controller 22 may allow memory 14 to send both. In one embodiment, memory controller 22 may provide information to cache controller 21 that will allocate the location in the data storage array 265 for storing the additional data that was just return by memory 14 as a least recently used location.

In the illustrated embodiment, cache controller 21 includes a cache monitor 224 that may be configured to monitor cache performance. As will be described in greater detail bellow, in one embodiment, the cache monitor 224 may determine the performance of the L3 cache 60 in terms of hit rates of requested cache lines. More particularly, memory controller 22 may use the performance information provided by cache monitor 224 to determine where in the LRU stack to allocate a location in the L3 cache 60 when storing additional cache line data returned from memory 14.

Figure 3:
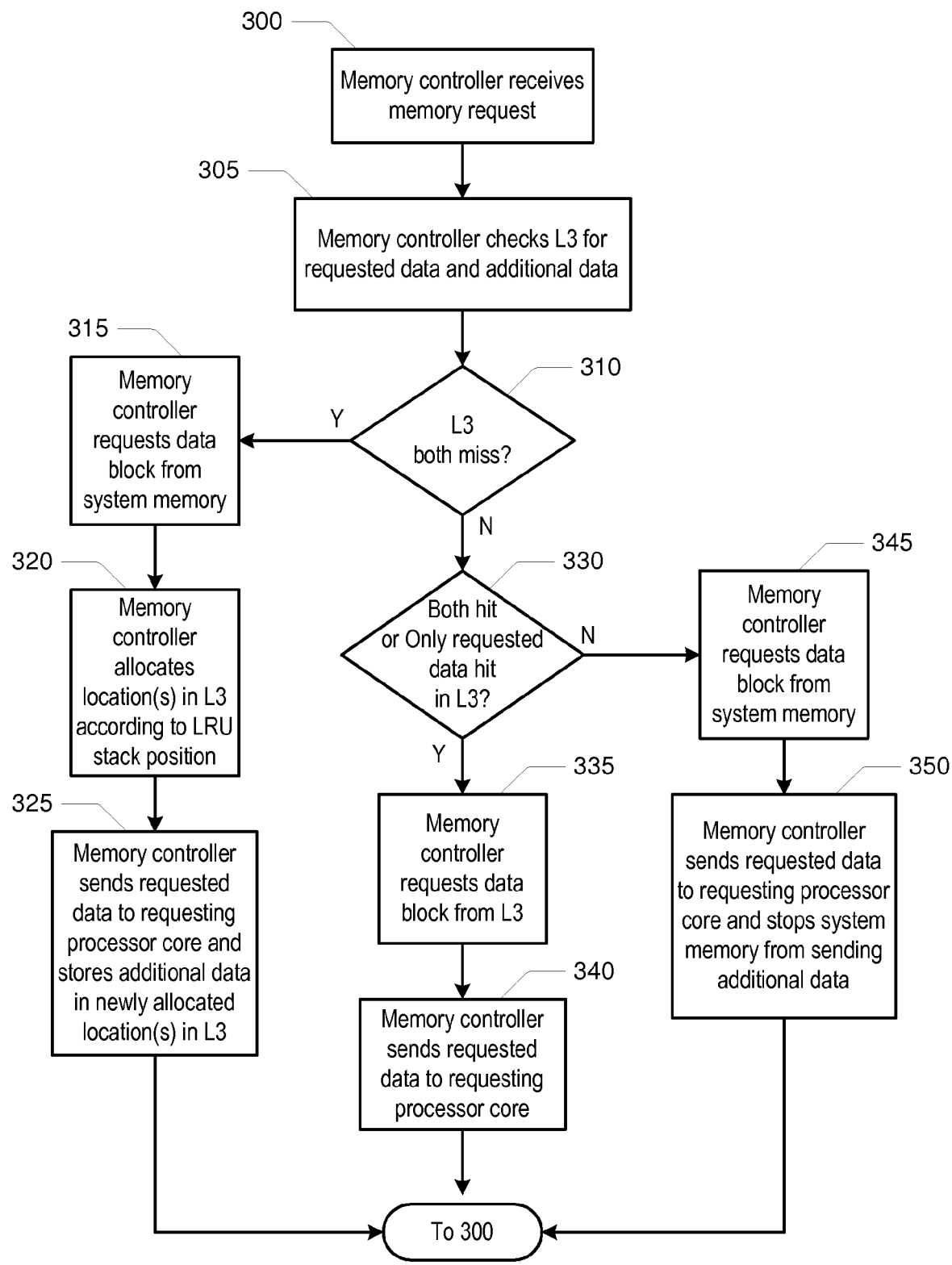
FIG. 3 is a flow diagram describing the operation of the embodiments shown in FIG. 1 and FIG. 2.

FIG. 3 is a flow diagram that describes the operation of the embodiments shown in FIG. 1 and FIG. 2. Referring collectively to FIG. 1 through FIG. 3, and beginning in block 300 the memory controller 22 receives a request for a data block beginning at a given address. In one embodiment, the data block corresponds to a cache line and the given address is a cache line address. The memory controller 22 sends the request to the cache controller 21 to check the L3 cache 60 for the requested cache line data and the additional cache line data, as described above (block 305).

If both the requested cache line data and the additional cache line data miss in the L3 cache 60 (block 310), the memory controller 22 sends the request to memory 14 (block 315). In one embodiment, the memory controller 22 may be configured to, by default, allocate the location for the additional cache line data as the least recently used position in the LRU stack (block 320). In that case, that location will be chosen first to be overwritten if an LRU replacement algorithm is used.

In another embodiment, the memory controller 22 may use the cache performance information provided by cache monitor 224 to determine where in the LRU stack to assign to the additional cache line data. For example, the L3 cache 60 may have a high hit rate on the victim or other data that is already stored therein, thus giving that type of data a higher priority for staying in the cache longer. As such, memory controller 22 may allocate the location for the additional cache line data as the least recently used in the cache. Alternatively, memory controller 22 may allocate the location as the most recently used or anywhere in between. It is noted that the LRU stack position may be application dependent. For example, the hit rates for a given cache line may be dependent upon the access patterns of the software application that is running. Accordingly, to determine the best LRU stack position to assign to the additional data, the memory controller 22 may be configured to make dynamic adjustments, either periodically or at random intervals, to the LRU stack position, and then monitor the results provided by the cache monitor 224. Memory controller 224 may select the LRU stack position that yields the best performance. In another embodiment, cache monitor 224 may also monitor the hit rates for other data stored within the L3 cache 60. The ideal LRU stack position assignments would yield a maximum sum value of the hit rates for both the additional data and the other data.

Memory 14 may return the requested cache line data first, followed by the additional cache line data. Memory controller 22 may send the requested cache line data to the requesting processor core 15, and send the additional cache line data to cache controller 21 for storage in the appropriate location within the L3 cache 60 (block 325).

Referring back to block 310, if both the requested cache line data and the additional cache line data do not miss in the L3 cache 60, then at least one of the requested cache line data or the additional cache line data has hit in the L3 cache 60. If both the requested cache line data and the additional cache line data hit in the L3 cache 60, or only the requested cache line data hits in the L3 cache 60 (block 330), the memory controller 22 sends the request for the cache line data to the cache controller 21 (block 335). Once the L3 cache 60 returns the requested cache line data, memory controller 22 sends the requested cache line data to the requesting processor core 15 (block 340).

Referring back to block 330, if both do not hit, and the requested cache line data misses, then the only additional cache line data has hit in the L3 cache 60. In this case, the memory controller 22 sends the request for the cache line data to memory 14 (block 345). However, once the memory 14 sends the requested cache line data, the memory controller 22 is configured to stop the transfer of the additional cache line data. This is sometimes referred to as chopping the transfer. In some embodiments there may be a penalty of one or more clock cycles since the memory 14 will not generally be ready for another access for those clock cycles. But that is still better than allowing the full transfer to take place, which would take several more clock cycles. Operation continues as described above in conjunction with the description of block 300.

It is noted that although the embodiments described above include a node having multiple processor cores, it is contemplated that the functionality associated with L3 cache subsystem 30 may be used in any type of processor, including single core processors. In addition, the above functionality is not limited to L3 cache subsystems, but may be implemented in other cache levels and hierarchies as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   a system memory; and
   a processor including one or more processor cores and a memory controller coupled to the system memory;
      wherein the memory controller is configured to control storage of data to and retrieval of data from the system memory;
      wherein the processor further includes a cache memory including a data storage array for storing blocks of data;
   wherein in response to a request for data by a given processor core, the system memory is configured to provide a first data block that corresponds to the requested data, and to provide an additional data block that is associated with the first data block and that was not requested by the given processor core and was not requested by the memory controller; and
   wherein the memory controller is configured to provide the first data block to the given processor core and to store the additional data block in the cache memory.

2. The computer system as recited in claim 1, wherein the memory controller is further configured to allocate an entry in the cache memory for the additional data block as a least recently used entry.

3. The computer system as recited in claim 2, wherein the memory controller is further configured to selectively allocate the entry in the cache memory for the additional data block as a location having a status that is in the range defined by least recently used and most recently used dependent upon a performance level of the cache memory.

4. The computer system as recited in claim 1, wherein the memory controller is configured to snoop the cache memory for both the first data block and the additional data block prior to performing the request for data from the system memory.

5. The computer system as recited in claim 4, wherein in response to a miss in the cache memory for both the first data block and the additional data block, the memory controller is configured to perform the request for data from the system memory.

6. The computer system as recited in claim 5, wherein in response to a miss in the cache memory for the first data block and a hit for the additional data block, the memory controller is configured to perform the request for data from the system memory, to stop the data transfer before the additional data block is sent from the system memory, and to provide the first data block to the given processor core.

7. The computer system as recited in claim 1, wherein in response to the request for data by a given processor core, the memory controller is configured to provide the first data block and not the additional data block to the given processor core.

8. The computer system as recited in claim 1, wherein the cache memory comprises a level three (L3) cache memory.

9. A processor node comprising:
   one or more processor cores;
   a memory controller coupled to the one or more processor cores, wherein the memory controller is configured to control storage of data to and retrieval of data from a system memory;
   a cache memory including a data storage array for storing blocks of data;
   wherein in response to a request for data by a given processor core, the system memory is configured to provide a first data block that corresponds to the requested data, and to provide an additional data block that is associated with the first data block and that was not requested by the given processor core and was not requested by the memory controller; and
   wherein the memory controller is configured to provide the first data block to the given processor core and to store the additional data block in the cache memory.

10. The processor node as recited in claim 9, wherein the memory controller is further configured to allocate an entry in the cache memory for the additional data block as a least recently used entry.

11. The processor node as recited in claim 10, wherein the memory controller is further configured to selectively allocate the entry in the cache memory for the additional data block as a location having a status that is in the range defined by least recently used and most recently used dependent upon a performance level of the cache memory.

12. The processor node as recited in claim 9, wherein the memory controller is configured to snoop the cache memory for both the first data block and the additional data block prior to performing the request for data from the system memory.

13. The processor node as recited in claim 12, wherein in response to a miss in the cache memory for both the first data block and the additional data block, the memory controller is configured to perform the request for data from the system memory.

14. The processor node as recited in claim 13, wherein in response to a miss in the cache memory for the first data block and a hit for the additional data block, the memory controller is configured to perform the request for data from the system memory, to stop the data transfer before the additional data block is sent from the system memory, and to provide the first data block to the given processor core.

15. A method comprising:
   a memory controller requesting data from a system memory in response to receiving a corresponding request for the data by a processor core of a processing node;
   a system memory providing, in response to the request for the data by the memory controller, a first data block that corresponds to the requested data, and an additional data block that is associated with the first data block and that was not requested by the given processor core and was not requested by the memory controller; and
   the memory controller providing the first data block to the processor core and storing the additional data block in a cache memory.

16. The method as recited in claim 15, further comprising the memory controller allocating an entry in the cache memory for the additional data block as a least recently used entry.

17. The method as recited in claim 16, further comprising the memory controller selectively allocating the entry in the cache memory for the additional data block as a as a location having a status that is in the range defined by least recently used and most recently used dependent upon a performance level of the cache memory.

18. The method as recited in claim 17, further comprising the memory controller snooping the cache memory for both the first data block and the additional data block prior to requesting data from the system memory.

19. The method as recited in claim 18, wherein in response to a miss in the cache memory for both the first data block and the additional data block, the memory controller requesting the first data block from the system memory.

20. The method as recited in claim 19, wherein in response to a miss in the cache memory for the first data block and a hit for the additional data block, the memory controller requesting the first data block from the system memory, stopping the data transfer before the additional data block is sent from the system memory, and providing the first data block to the processor core.

* * * * *